United States Patent [19]

Demeyer et al.

[11] Patent Number: 4,571,659

[45] Date of Patent: Feb. 18, 1986

[54] STATIC OVERCURRENT TRIP DEVICE TO OPERATE A CIRCUIT BREAKER IN RESPONSE OF FAULT CONDITIONS IN AN ALTERNATING CURRENT NET SYSTEM

[75] Inventors: Pierre Demeyer, Uriage; Philippe Duval, Créteil, both of France

[73] Assignee: Merlin Gerin, Grenoble, France

[21] Appl. No.: 513,283

[22] Filed: Jul. 13, 1983

[30] Foreign Application Priority Data

Jul. 12, 1982 [FR] France ................................ 82 12329

[51] Int. Cl.⁴ ............................................ H02H 3/093
[52] U.S. Cl. ........................................ 361/95; 361/97; 361/31
[58] Field of Search ...................... 361/93, 94, 95, 96, 361/97, 98, 31; 328/144, 145

[56] References Cited

U.S. PATENT DOCUMENTS

| | | | |
|---|---|---|---|
| 3,558,978 | 1/1971 | Nye, Jr. et al. | 361/31 X |
| 3,900,785 | 8/1975 | Alric et al. | 361/94 X |
| 3,942,074 | 3/1976 | Graham | 361/96 |
| 4,278,930 | 7/1981 | Rogers | 361/93 X |
| 4,345,288 | 8/1982 | Kampf et al. | 361/94 X |
| 4,347,541 | 8/1982 | Chen et al. | 361/96 X |

FOREIGN PATENT DOCUMENTS

| | | |
|---|---|---|
| 2023317 | 11/1970 | Fed. Rep. of Germany . |
| 2402091 | 4/1973 | Fed. Rep. of Germany . |
| 2148581 | 5/1975 | Fed. Rep. of Germany . |

Primary Examiner—Patrick R. Salce
Attorney, Agent, or Firm—Parkhurst & Oliff

[57] ABSTRACT

The analog electronic trip device comprises a time-lag tripping circuit formed by a non-linear function generator likely to elaborate by approximation the tripping characteristic of the circuit breaker.

The device includes an integrating amplifier comprising a negative-feedback capacitor C and two inputs in phase opposition. One of the inputs is submitted to two threshold voltages $V_{R1}$, $V_{R2}$ determining the mode of long-time delay or short-time delay operation of the trip device. The second threshold voltage $V_{R2}$ is set by a resistive switch which determines the short delay tripping threshold.

5 Claims, 7 Drawing Figures

STATIC OVERCURRENT TRIP DEVICE TO OPERATE A CIRCUIT BREAKER IN RESPONSE OF FAULT CONDITIONS IN AN ALTERNATING CURRENT NET SYSTEM

BACKGROUND OF THE INVENTION

The invention relates to an electronic trip device associated with a circuit breaker for protecting an alternating current net system, comprising:
 a current sensor for measuring the current intensity flowing in each line R, S, T of the net system,
 a time-lag tripping circuit for controlling the signal representative of the current delivered by the sensor, and comprising a non-linear function generator which approximates the inverse time delay tripping characteristic of the circuit breaker,
 a level detector delivering a control order to a switching member when the output signal of the time-lag tripping circuit exceeds a predetermined threshold in reply to an excessive increase of the line current,
 and a tripping coil, the excitation of which is driven by the switching member to cause the opening of the circuit breaker contacts.

Some non-linear function generators permit an ideal tripping characteristic $I^2t = k$ to be obtained, but still require a complex electronic circuit comprising a circuit to square the signal representative of the monitored current, and an integrating additional circuit connected to a level detector. An operational amplifier is necessary for each function, and the complexity of this connection is particularly expensive for low ratings circuit breakers.

SUMMARY OF THE INVENTION

An object of the present invention consists in realizing a simple and inexpensive electronic trip device which can be housed in a moulded housing suitable for low ratings circuit breakers.

The electronic trip device is characterized in that the non-linear function generator is formed by an integrating analog circuit comprising a negative-feedback capacitor C and two inputs in phase opposition, the one of which collects at least a reference signal corresponding to a predetermined threshold voltage, and the other of which receives the signal representative of the monitored current through a selector switch, the tripping time t of the time-lay tripping circuit being characterized as the relation $$L \frac{b - aI}{aI - c}$$

defined by the integrated output signal of the circuit, the parameters L and c representing the time constant and the threshold voltage of the integrator respectively, 'b' the threshold voltage of the level detector disposed at the circuit output and 'a' a proportionality coefficient set by the selector switch.

The shape of the tripping curve obtained through the integrating analog operator associated with a single threshold voltage, is next to the ideal curve $I^2t = k$. The time constant RC of the integrator is set by means of an adjusting switch of the resistance or the capacitor value. Each value of the time constant corresponds to a predetermined tripping curve.

By applying two threshold voltages at the phase-shifter input of the integrating circuit, it is possible to obtain a particular tripping curve comprising a first slope with long time delay protection against the overcurrents, and a second slope with short-time delay protection against short-circuits. The choice of the tripping results from the value of the second threshold voltage and from the input voltage proportional to the monitored current. If this input voltage falls between the reference values of the two threshold voltages, the integrator is characterized by a first time constant which determines the first slope of the curve. When the input voltage is above the second voltage, the new time constant below the first one generates the second slope with short time delay protection. The value of the second threshold voltage is set to bind of the threshold of the short-time delay tripping.

It is possible to obtain a tripping curve with three slopes by means of an integrating operator having three predetermined threshold voltages.

The analog circuit of the time-lag tripping circuit is formed by a single integrating operational amplifier, having a predetermined tripping curve of which depends upon the value and number of threshold voltages. The structure of the trip device is thus simplified to a minimum of components.

Other advantages and technical data will more clearly appear from the following description, wherein reference is made to the accompanying drawings, in which:

DETAILED DESCRIPTION OF PREFERRED EMBODIMENTS

Figure 1:
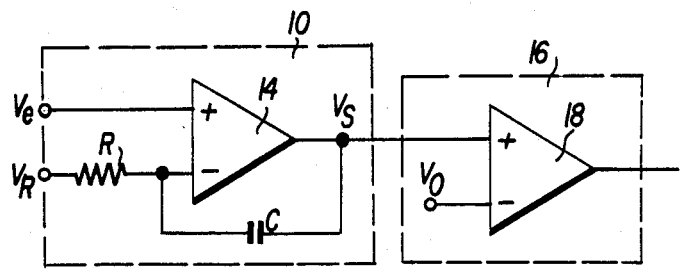
FIG. 1 represents the scheme of an integrating analog circuit associated with a threshold circuit to constitute a time-lag trip device according to the invention.

FIG. 1 represents an analog electronic circuit 10 comprising an integrator 12 formed by an operational amplifier 14, the capacitive negative-feedback loop of which comprises a capacitor C connected between the output and the phase-shifter inverting input (input −) of the amplifier 14. The circuit of the phase-shifter input comprises a resistance R, the fixed or adjustable value of which determines the time constant RC of the integrator 12. The phase-shifter input (input −) and the direct input (non-inverting input +) of the amplifier 14 are driven by two input voltages $V_R$ and $V_e$ respectively, $V_R$ being the threshold voltage of the integrator 12. The output integrated signal $V_S$ of the integrator 12 is generated by a level detector 16 formed by an operational amplifier 18 with threshold voltage $V_o$. The integrating amplifier 14 is locked when the input voltage $V_e$ is below the threshold voltage $V_R$, and the capacity C is then discharged. The unlocking of the amplifier 14 occurs if the voltage $V_e$ is above the threshold voltage $R_R$ and the output voltage $V_S$ of the amplifier 14 reaches the threshold voltage $V_o$ of the level detector 16 at the end of a time $$t = RC \frac{V_o - V_e}{V_e - V_R}.$$

The shape of the tripping curve desired for the protection against over-currents is generally defined by the relation $I^2 t = k$ in which k is a constant, t the tripping time of the trip device, and I the value of the current flowing through the circuit breaker referred to the setting current. This inverse time non-linear function is represented on a linear scale by the dotted curve A of FIG. 2. A calculation by approximation permits the characterization of the ideal function $I^2 t = k$ as an equivalent function defined by the relation $$t = L \frac{b - aI}{aI - c}.$$

This equivalent function is identified with the relation $$t = RC \frac{V_o - V_e}{V_e - V_R}$$

determined by the analog circuit 10 of FIG. 1, when the integrating amplifier 12 is unlocked:

t is the tripping time,

L represents the time constant RC of the integrator 12, b represents the threshold voltage $V_o$ of the level detector 18 disposed at the output of the integrator 12, c represents the threshold voltage $V_R$ of the integrator 12, aI represents the input voltage $V_e$ of the integrator 12, a being the proportionality coefficient between the voltage $V_e$ and the current I flowing through the circuit breaker referred to as the setting current.

Figure 2:
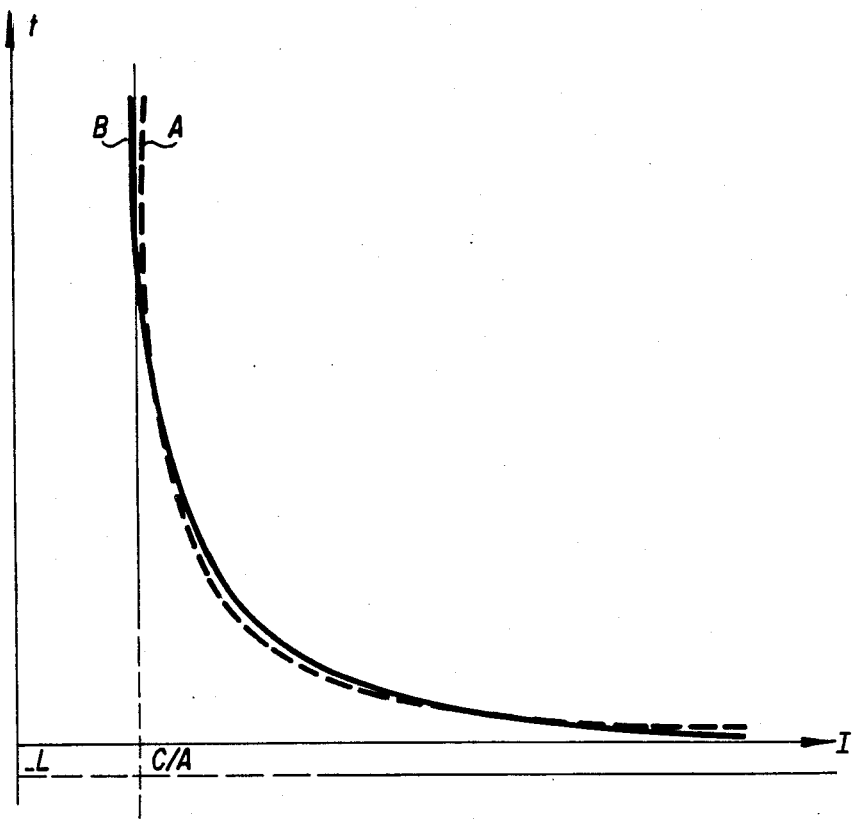
FIG. 2 shows two tripping characteristics with linear scale of the tripping time versus the monitored current referred to as the setting current, the curve A (dotted lines) being the ideal characteristic of the type $I^2t = k$, and B (thick lines) the characteristic obtained by means of the circuit according to FIG. 1.

Thus the function obtained by the analog circuit 10 of FIG. 1 is represented by the tripping curve B of FIG. 2 (thick lines). The shape of curve B is very near the one of the desired curve A, and can advantageously constitute an inverse time tripping characteristic of a static trip device for the protection against the over-currents.

The tripping curve B represented on FIG. 2 corresponds to a predetermined value of the resistance R connected to the phase-shifter input of the operational amplifier 14. By replacing the resistance R by a potentiometer, the value of the time constant RC of the integrator 12 can be set according to the cursor position. It is thus possible to obtain a family of over-current tripping characteristics B, wherein a predetermined tripping curve corresponds to each position of the potentiometer cursor.

Figure 3:
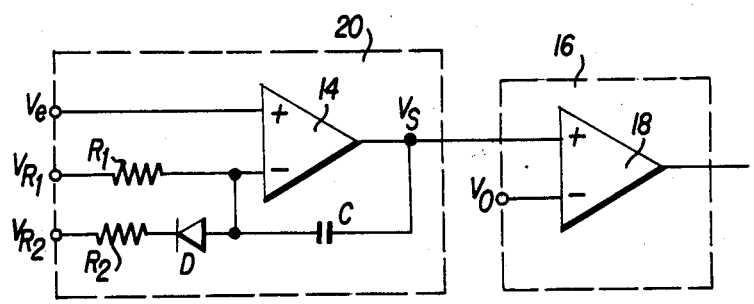
FIG. 3 is a variant of FIG. 1 representing circuit with two threshold voltages.

On FIG. 3 the analog circuit 20 is similar to the one of FIG. 1, but the phase-shifter input of the operational amplifier 14 is driven through resistances $R_1$, $R_2$ by a first and a second threshold voltage $V_{R1}$ and $V_{R2}$ of distinct values. A diode D is inserted between the resistance $R_2$ and the amplifier 14, the phase-shifter input being connected to the anode of the diode D. The remainder of the circuit 20 is similar to the one of FIG. 1. The voltage $V_e$ applied to the direct input of the amplifier 14 depends on the current I flowing through the circuit breaker referred to as the setting current.

The performance of the analog circuit 20 according to FIG. 3 is the following:

When the value of the input voltage $V_e$ applied to the direct input of the operational amplifier 14 falls between the reference values of the two threshold voltages $V_{R1}$ and $V_{R2}$, the performance of the circuit 20 is identical with the circuit 10 of FIG. 1. The time constant $R_1 C$ of the integrator generates a tripping curve B illustrated on FIG. 2.

Figure 4:
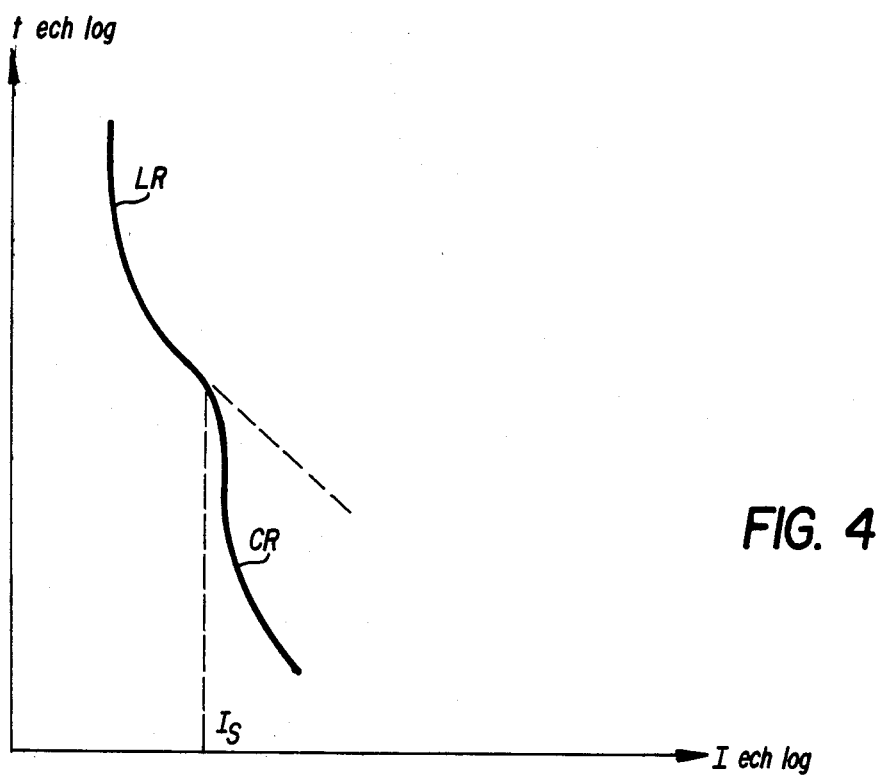
FIG. 4 shows the tripping characteristic generated by the circuit on a logarithmic scale according to FIG. 3.

When the input voltage $V_e$ is above the second threshold voltage $V_{R2}$ of the amplifier 14, the time constant $R_2 C$ of the integrator is modified and another tripping curve characterized by a tripping threshold higher than the first one, is obtained. FIG. 4 illustrates the resulting tripping curve obtained by means of the analog circuit 20 at a logarithmic scale. It can be noted that the curve with two slopes comprises a part LR with long delay protection against the over-currents and a part CR with short delay protection against the short-circuits; the function of short-time delay tripping is obtained after the current exceeds the short delay tripping threshold $I_s$, i.e. when $V_e$ is above the threshold voltage $V_{R2}$.

Figure 5:
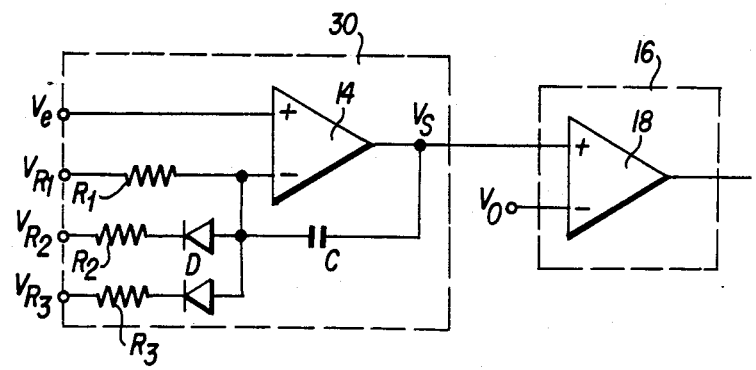
FIG. 5 is another variant of FIG. 1.

FIG. 5 shows an analog circuit 30 similar to the circuit 20 of FIG. 3, but comprising an additional reference circuit as well in which a third voltage $V_{R3}$ is applied through a resistance $R_3$ and a diode D at the phase-shifter input of the integrating amplifier 14. Then the resulting tripping curve presents three slopes, that is to say a first long time delay tripping slope LR (protection against the over-currents) when the voltage $V_e$ falls between the threshold voltages $V_{R1}$ and $V_{R2}$, a second intermediate slope $CR_2$ of short time delay tripping (protection against the short-circuits) when the voltage $V_e$ falls between the threshold voltages $V_{R2}$ and $V_{R3}$, and a third slope $CR_1$ of short time delay (protection against important short-circuits) when $V_e$ is above the threshold voltage $V_{R3}$. The second intermediate slope $CR_2$ is delimited by two short delay threshold currents $I_{S1}$ and $I_{S2}$ of predetermined values.

Figure 6:
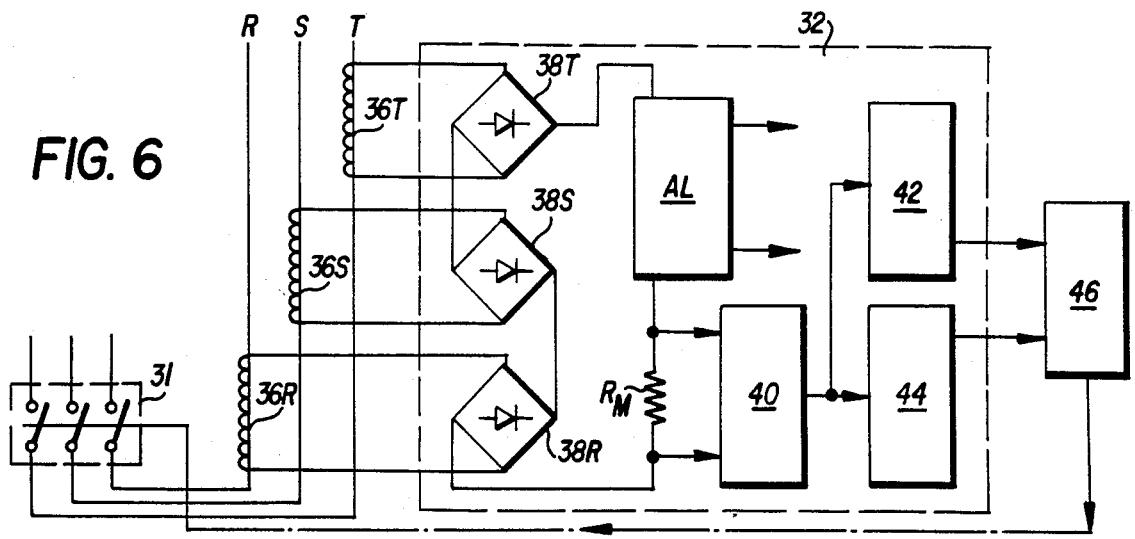
FIG. 6 shows the synoptic scheme of an electronic trip device incorporating a time-lag tripping circuit according to the invention.

FIG. 6 shows the synoptic scheme of an electronic trip device 32 without auxiliary source to operate a circuit breaker 31 for protecting the lines R, S, T of the three-phase alternating net systems. The intensity of the current flowing in each line R, S, T is controlled by a current transformer 36R, 36S, 36T, the measuring secondary winding is connected to a full wave rectifier bridge 38R, 38S, 38T. The outputs of bridges 38R, 38S, 38T are series connected and the total rectified current is applied to a supply circuit AL and to a measuring resistance $R_M$. The measuring signal at the terminals of the resistance $R_M$ is delivered to a level detector associated with a shaping circuit 40 cooperating with a time-lag tripping circuit 42 and an instantaneous tripping circuit 44. A threshold and control circuit 46 is driven by the output signals of the two time-lag tripping 42 and instantaneous 44 circuits to cause the opening of the circuit breaker 31 when the line current exceeds a predetermined threshold. The time-lag tripping circuit 42 can be implemented by any of the analog circuit 10, 20, 30 previously described in reference to FIGS. 1, 3 and 5 respectively. The instantaneous tripping circuit 44 is generally provided for installations having a low electrodynamic level. The instantaneous tripping threshold is above the time-lag tripping threshold and is slightly below the maximum current of electrodynamic level of the circuit breaker.

Figure 7:
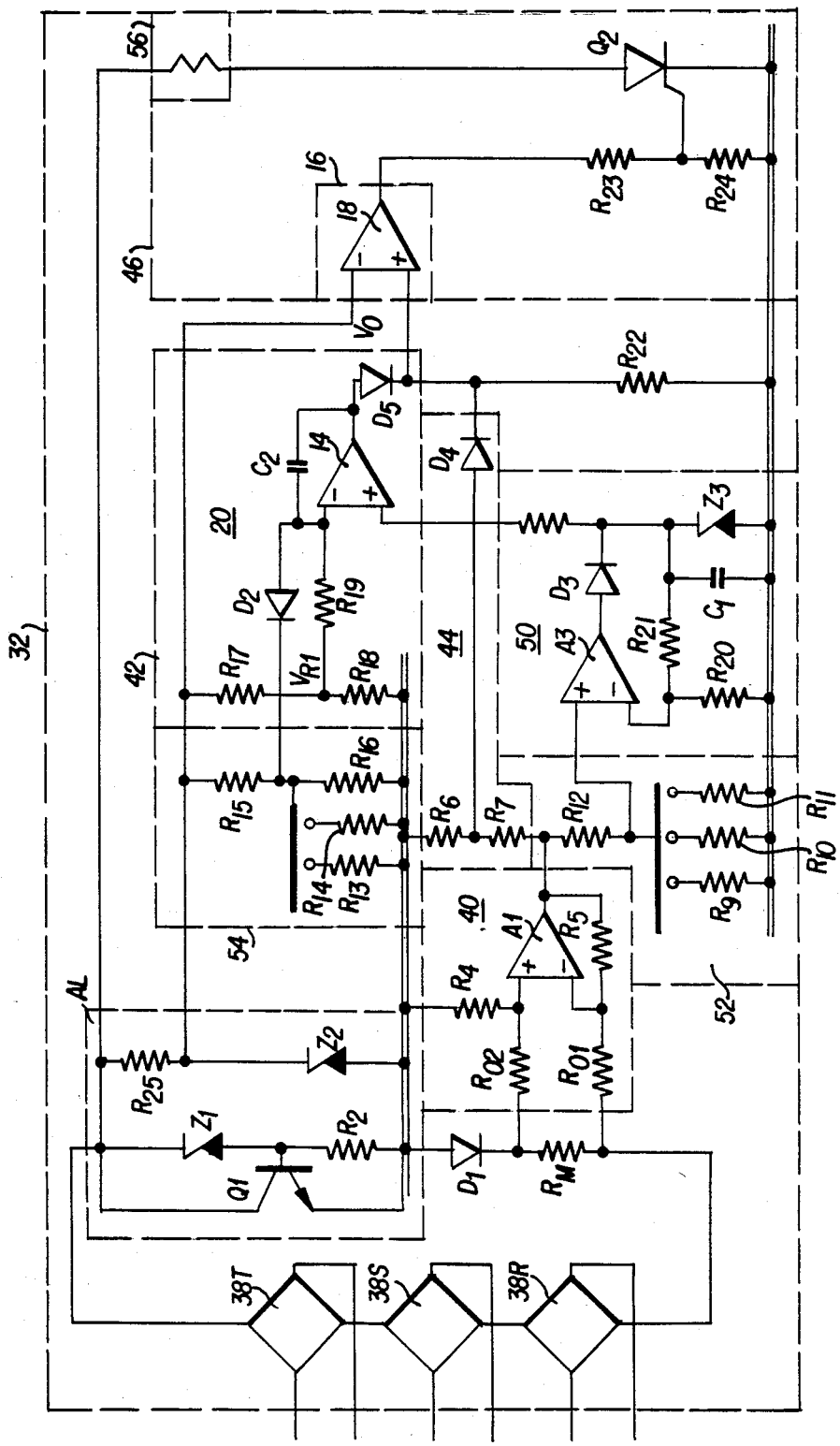
FIG. 7 is the detailed scheme of the trip device according to FIG. 6, the circuit of the time-lag tripping circuit being of the type illustrated by FIG. 3.

FIG. 7 represents a type of realization of the static trip device 32 according to FIG. 6, the time-lag tripping circuit 42 comprising the analog circuit 20 with two threshold voltages $V_{R1}$ and $V_{R2}$, illustrated in FIGS. 3 and 4. The circuit 40 connected to the terminals of the measuring resistance $R_M$ comprises a differential amplifier $A_1$ associated with resistances $R_{01}$, $R_{02}$, $R_4$ and $R_5$. The resistance $R_{02}$ is connected to the direct input (+) and to one of the terminals of the measuring resistance $R_M$ connected to the negative pole of the supply AL by a diode $D_1$. The resistance $R_4$ is branched between the direct input of the amplifier $A_1$ and the negative pole of the supply AL, whereas the resistance $R_{01}$ is connected between the phase-shifter input (−) and the other terminal of the measuring resistance $R_M$. The negative-feedback resistance $R_5$ is connected between the amplifier $A_1$ output and the phase-shifter input.

The output of the differential amplifier $A_1$ is branched on the one hand to the instantaneous tripping circuit 44 formed by a resistive bridge $R_6$–$R_7$ with mid point connected to a diode $D_4$, and the other hand to a shaping circuit comprising a peak detector 50. The latter is equipped with an operational amplifier $A_3$, the phase-shifter input (−) of which is connected to the negative pole of the supply AL by means of a resistance $R_{20}$ in parallel on a series circuit with resistance $R_{21}$ and capacitor $C_1$. A Zener diode $Z_3$ is in parallel with the capacitor $C_1$ and the output of the amplifier $A_3$ is connected through a diode $D_3$ to the direct input (+) of the integrating amplifier 14 of the time-lag tripping circuit 42. The direct input (+) of the amplifier $A_3$ is in conjunction with a resistive selector switch 52, for example with resistances $R_{12}$-$R_{11}$-$R_{10}$-$R_9$ or potentiometer branched between the negative pole of the supply and the differential amplifier $A_1$ output. The resistive selector 52 ensures the setting of the voltage $V_e$ range for the long delay and short delay functions of the time-lag tripping circuit 42 owing to the adjustment of the proportionality coefficient 'a' appearing in the relation $$t = L \frac{b - aI}{aI - c}.$$

The phase-shifter input (−) of the integrating amplifier 14 with negative-feedback capacitor C of the time-lag tripping circuit 42 is connected by a resistance $R_{19}$ to a resistances divider $R_{17}$-$R_{18}$, branched in parallel with the terminals of a Zener diode $Z_2$ of the supply AL. The voltage at the resistance $R_{18}$ terminals constitutes the first threshold voltage $V_{R1}$ of the integrating amplifier 14 such as that described as reference in FIG. 3. A diode $D_2$ is connected to the phase-shifter input of the amplifier 14 by its anode and to an adjusting device 54 of the short delay tripping threshold $I_S$ of the circuit 42 determined by the second threshold voltage $V_{R2}$ by its cathode. The adjusting device 54 formed by a resistances switch $R_{13}$-$R_{14}$-$R_{15}$ and $R_{16}$ or a potentiometer is branched in parallel with the terminals of the Zener diode $Z_2$ and enables the modification of the time constant of the integrating amplifier 14.

The output of the integrating amplifier 14 is connected through a diode $D_5$ to the direct input of the amplifier 18 of the level detector 16, the other input (−) being connected to the Zener diode $Z_2$ to fix the threshold voltage $V_o$ at the amplifier 14 output. The diode $D_4$ of the instantaneous tripping circuit 44 is also branched to the direct input (+) of the amplifier 18. The output of the latter can control the arcing of a thyristor $Q_2$ series connected with the tripping coil 56 of the circuit breaker 34, the assembly coil 56, and thyristor $Q_2$ being connected to the positive and negative poles of the supply AL with specific current.

The performance of the electronic trip device 32 according to FIG. 7 is the following:

The voltage at the terminals of the measuring resistance $R_M$ is not sufficient in rating to release the time-lag tripping circuit 42, the instantaneous tripping circuit 44 and the level detector 16. The thyristor is found in the non conducting state, and the tripping coil 56 is not supplied.

The release of the time-lag tripping circuit 42 occurs when an overload or short-circuit current appears in one of the lines R, S, T of the net system to protect. If the short-circuit is very important, the instantaneous tripping circuit 44 reacts before the time-lag tripping circuit 42 and induces the immediate arcing of the thyristor $Q_2$ through the level detector 16.

The time-lag tripping circuit 42 is called into play when the fault current intensity is below the instantaneous tripping threshold. The voltage $V_e$ applied to the input (+) of the integrating amplifier 14 depends on the intensity of the monitored current and on the proportionality factor "a" determined by the preliminary setting of the resistive selector switch 52. For low overloads, the intensity of which is below the short delay tripping threshold $I_S$ (FIG. 4), the voltage value $V_e$ is between the threshold voltages $V_{R1}$ and $V_{R2}$ of the amplifier 14. Then the time constant $R_{19}$ -C of the integrator generates along delay tripping curve LR. For short-circuits, the intensity of which falls between the short delay tripping threshold $I_S$ and the instantaneous tripping threshold, the voltage $V_e$ is above the second threshold voltage $V_{R2}$ set by the resistance switch $R_{13}$ to $R_{16}$. A modification of the integrator time constant generating a short delay tripping curve CR results from this. In the two cases of tripping CR or LR of the circuit 42, the thyristor $Q_2$ becomes conducting after a time t when the output voltage $V_S$ delivered by the integrating amplifier 14 reaches the threshold voltage $V_o$ of the level detector 16.

It is noticed that the double function of the short delay or long delay time-lag tripping circuit 42 is obtained with a single integrating amplifier 14. Thus the structure of the electronic release 32 is simplified to a minimum of components and presents reduced over-all dimensions, consistent with the volume of low voltage circuit breakers having moulded casing with ratings comprised between 250 A and 1000 A.

The invention is not at all limited to the embodiments more fully described and shown on the accompanying drawings, but on the contrary it extends to any variant remaining in the limit of the electronic equivalences, in particular the one in which the setting of the voltage $V_e$ and threshold voltages $V_{R1}$ and $V_{R2}$ of the integrating amplifier 14 of the time-lag tripping circuit 42 is carried out by means of adjusting comprising no resistances, and that the modification of the integrator time constant takes place by varying the value of the negative-feedback capacitor C. It is noticed that the voltage at the terminals of the negative-feedback capacitor C is the temperature image. When the current varies round the setting current, the thermal image cools all the quicker as the current is lower.

What is claimed is:

1. An electronic trip device for controlling a circuit breaker having separable contacts electrically coupled in the lines of an alternating current system, said trip device comprising:

current sensing means for measuring the intensity of current flowing in each line of an alternating current system and for generating a signal proportional in magnitude to that line current;

a first time-lag tripping circuit coupled to receive said signal proportional to said line current and provide a first output, said first time-lag tripping circuit including a non-linear function generator which approximates the inverse time tripping characteristics of a circuit breaker and which comprises, an integrating analog circuit constructed as an operational amplifier having inverting and non-inverting inputs and an output, a negative feedback capacitor having a capacitance C electrically connected between the inverting input and output of the operational amplifier, a resistor having a first terminal and a second terminal coupled to said inverting input, said resistor having a resistance R, first means for providing at least one reference signal as a predetermined threshold signal to the first terminal of said resistor, and second means for coupling said signal proportional to line current through a selector and peak detector to said non-inverting input of said operational amplifier, said output of said operational amplifier defining the tripping time of the first time-lag tripping circuit wherein the tripping time t is equal to L(b-aI)/(aI-c) where I is the line current, L is the time constant RC, c is a first threshold voltage represented by said reference signal, b is a second threshold voltage and a is a proportionality coefficient set by said selector;

a second instantaneous tripping circuit coupled to receive said signal proportional to line current and provide a second output;

level detector means coupled to receive the outputs of said first and second tripping ciruits for providing a tripping signal when either of said outputs exceed another predetermined threshold voltage;

switching means for providing a switching signal in response to said tripping signal;

a tripping coil coupled to be responsive to said switching signal and operably coupled to cause the opening of the contacts in said circuit breaker in response to said tripping signal.

2. The device of claim 1 wherein said first means provides a plurality of threshold voltages to said inverting input of said operational amplifier such that there is defined a tripping curve for the circuit breaker which includes a plurality of slopes determining the tripping period for the first time-lag tripping circuit.

3. The device of claim 2 wherein said first means includes first and second threshold voltages coupled through respective resistances to said inverting input of said operational amplifier such that the time constant L has a first value for providing long delay protection when the signal proportional to line current falls between said first and second threshold voltages and a second value less than said first value for providing short delay protection for short circuits when said signal proportional to line current is greater than said second threshold voltage, said time constant variation being automatically variable in response to the value of said second threshold voltage.

4. The device of claim 3 wherein said second threshold voltage is coupled in series through a variable resistance and diode to the inverting input of the operational amplifier.

5. The device of claim 1 wherein said current sensing means includes a measuring resistance to sense said line current and further wherein said instantaneous tripping circuit comprises a resistive bridge having an input and output, said input of the resistive bridge being coupled to an output of a differential amplifier having first and second inputs coupled to said measuring reisitance, said output of said resistive bridge being coupled through a diode as the output of said instantaneous tripping circuit and said output of said operational amplifier being coupled through a diode as the output of said first time-lag tripping circuit.

* * * * *